US012701363B2

(12) United States Patent
Pal

(10) Patent No.: US 12,701,363 B2
(45) Date of Patent: Aug. 4, 2026

(54) SURROUND SOUND IN AUTOMOTIVE AUDIO SYSTEM

(71) Applicant: Atieva, Inc., Newark, CA (US)

(72) Inventor: Vinay Kumar Pal, Fremont, CA (US)

(73) Assignee: Atieva, Inc., Newark, CA (US)

( * ) Notice: Subject to any disclaimer, the term of this patent is extended or adjusted under 35 U.S.C. 154(b) by 239 days.

(21) Appl. No.: 18/720,194

(22) PCT Filed: Dec. 14, 2022

(86) PCT No.: PCT/US2022/081585
§ 371 (c)(1),
(2) Date: Jun. 14, 2024

(87) PCT Pub. No.: WO2023/114865
PCT Pub. Date: Jun. 22, 2023

(65) Prior Publication Data
US 2025/0063305 A1      Feb. 20, 2025

Related U.S. Application Data

(60) Provisional application No. 63/265,451, filed on Dec. 15, 2021.

(51) Int. Cl.
H04R 5/00          (2006.01)
G06F 3/16          (2006.01)
(Continued)

(52) U.S. Cl.
CPC .............. H04R 5/04 (2013.01); G06F 3/162 (2013.01); G06F 3/165 (2013.01); H04R 2499/13 (2013.01)

(58) Field of Classification Search
CPC ....... H04R 5/04; H04R 2499/13; G06F 3/162; G06F 3/165
(Continued)

(56) References Cited

U.S. PATENT DOCUMENTS

2004/0125967 A1    7/2004   Eid et al.
2005/0018860 A1    1/2005   Furge et al.
(Continued)

OTHER PUBLICATIONS

International Search Report and Written Opinion for PCT Application No. PCT/US2022/081585, mailed on Mar. 30, 2023, 10 pages.
(Continued)

*Primary Examiner* — Ammar T Hamid
(74) *Attorney, Agent, or Firm* — Brake Hughes Bellermann LLP

(57)          ABSTRACT

A method of adapting an automotive audio system to support surround sound comprises: configuring an application program for creation of an audio track object that specifies passthrough mode as a playback mode, wherein the application program is installed to operate under an operating system that is not configured for surround sound; configuring a framework of the operating system with a bypass past a mixer of the operating system, wherein the bypass allows surround-sound data of the audio track object to bypass the mixer; and configuring a hardware abstraction layer with a separate channel for the surround-sound data received from the operating system, wherein the hardware abstraction layer processes the surround-sound data before providing the processed surround-sound data to a decoder.

12 Claims, 4 Drawing Sheets

(51) Int. Cl.
  H04R 5/04 (2006.01)
  H04R 5/02 (2006.01)
(58) Field of Classification Search
  USPC ..................................................... 381/26, 302
  See application file for complete search history.

(56) References Cited

U.S. PATENT DOCUMENTS

2009/0228615 A1 * 9/2009 Beckert .............. B60R 16/0315
                                                      710/21
2013/0272528 A1   10/2013 Soulodre et al.
2017/0169834 A1   6/2017 Jiang
2018/0098151 A1   4/2018 Penke et al.

OTHER PUBLICATIONS

Extended European Search Report for European Application No. 22908672.3, dated Oct. 7, 2025, 9 pages.

* cited by examiner

SURROUND SOUND IN AUTOMOTIVE AUDIO SYSTEM

CROSS-REFERENCE TO RELATED APPLICATION

This application is a 35 U.S.C. § 137 National Phase Entry Application from PCT Application No. PCT/US2022/081585, filed on Dec. 14, 2022, entitled "SURROUND SOUND IN AUTOMOTIVE AUDIO SYSTEM", and designating the U.S., which claims priority to U.S. Patent Application No. 63/265,451, filed on Dec. 15, 2021, and entitled "SURROUND SOUND IN AUTOMOTIVE AUDIO SYSTEM," the disclosures of which are incorporated by reference herein in their entireties.

TECHNICAL FIELD

This disclosure relates to providing surround sound in an automotive audio system.

BACKGROUND

While vehicles have had audio systems for decades, they have generally not been able to provide a listening experience close to the most sophisticated systems used in public venues such as movie theaters or the rapidly developing field of high-end home surround sound systems. However, the advancement and complexification of vehicle technology has changed the playing field in this regard. First, vehicles nowadays are provided with significantly more powerful computer processing resources which can increase the expectations of owners or other passengers of what the experience of riding in a modern vehicle should be like. Second, the proliferation of electric powertrains and advancements in aerodynamic design have made vehicles significantly quieter while driving, which increases the opportunity for the occupant to enjoy a first-class audio performance.

SUMMARY

In a first aspect, a method of adapting an automotive audio system to support surround sound comprises: configuring an application program for creation of an audio track object that specifies passthrough mode as a playback mode, wherein the application program is installed to operate under an operating system that is not configured for surround sound; configuring a framework of the operating system with a bypass past a mixer of the operating system, wherein the bypass allows surround-sound data of the audio track object to bypass the mixer; and configuring a hardware abstraction layer with a separate channel for the surround-sound data received from the operating system, wherein the hardware abstraction layer processes the surround-sound data before providing the processed surround-sound data to a decoder.

Implementations can include any or all of the following features. Configuring the application program comprises adding support for specifying the passthrough mode as the playback mode. The application program has a condition for providing surround sound output that the framework of the operating system should support surround sound playback, and wherein configuring the framework with the bypass causes the framework to satisfy the condition. The separate channel facilitates buffer management. The separate channel facilitates timestamp calculation. At least processing of the surround-sound data is performed using a first hardware board, wherein at least decoding is performed using a second hardware board separate from the first hardware board, and wherein the hardware abstraction layer uses the timestamp calculation to provide a frame estimate to the application program.

In a second aspect, a method of playing surround sound on an automotive audio system of a vehicle comprises: creating, using an application program of the automotive audio system, an audio track object that specifies passthrough mode as a playback mode, wherein the application program is installed to operate under an operating system that is not configured for surround sound; bypassing, in a framework of the operating system, a mixer of the operating system by surround-sound data of the audio track object; processing the surround-sound data at a hardware abstraction layer of the automotive audio system; providing the processed surround-sound data to a decoder to generate a decoded surround sound signal; and providing the decoded surround sound signal to at least one of multiple speakers of the vehicle.

Implementations can include any or all of the following features. The creation of the audio track object, the bypassing of the mixer, and the processing of the surround-sound data are performed using a first hardware board, and wherein the decoding and the provision of the decoded surround sound signal are performed using a second hardware board separate from the first hardware board. The application program has a condition for providing surround sound output that the framework of the operating system should support surround sound playback, and wherein the bypassing of the mixer causes the framework to satisfy the condition. The processing of the surround-sound data comprises buffer management. The processing of the surround-sound data comprises timestamp calculation. At least the processing of the surround-sound data is performed using a first hardware board, and wherein at least decoding is performed using a second hardware board separate from the first hardware board, the method further comprising using the timestamp calculation to provide a frame estimate to the application program.

BRIEF DESCRIPTION OF DRAWINGS

FIG. 1 shows a block diagram of an example of an audio system that can provide an immersive audio experience in a vehicle.

Like reference symbols or numerals in the various drawings indicate like elements.

DETAILED DESCRIPTION

Figure 2:
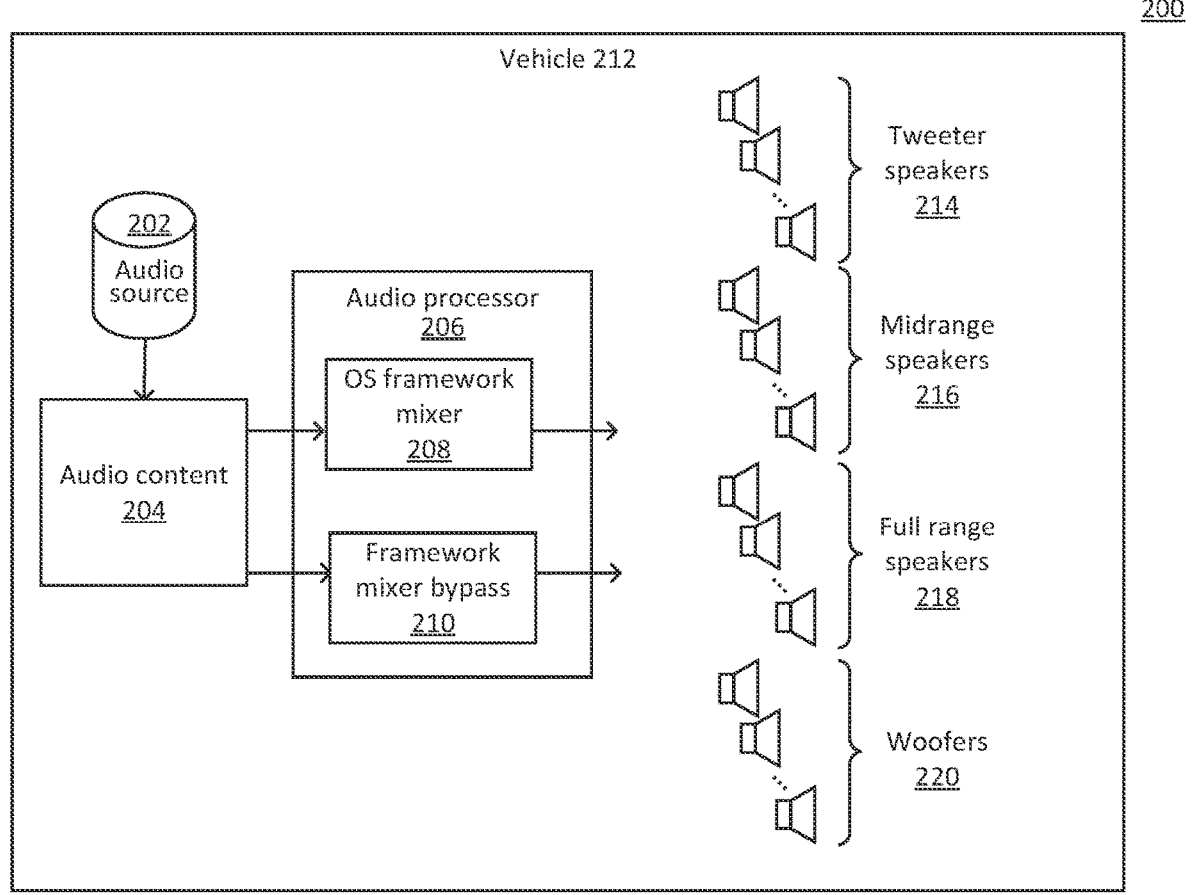
FIG. 2 shows an example of an audio system that supports surround sound.

The present disclosure gives examples of systems and techniques that provide surround sound in an automotive audio system.

Examples herein refer to a vehicle. A vehicle is a machine that transports passengers or cargo, or both. A vehicle can have one or more motors using at least one type of fuel or other energy source (e.g., electricity). Examples of vehicles include, but are not limited to, cars, trucks, and buses. The number of wheels can differ between types of vehicles, and one or more (e.g., all) of the wheels can be used for propulsion of the vehicle. The vehicle can include a passenger compartment accommodating one or more persons. At least one vehicle occupant can be considered the driver; various tools, implements, or other devices, can then be provided to the driver. In examples herein, any person carried by a vehicle can be referred to as a "driver" or a "passenger" of the vehicle, regardless whether or to what extent the person is driving the vehicle, or whether the person has access to all or only some of the controls for driving the vehicle, or whether the person lacks controls for driving the vehicle.

Figure 1:
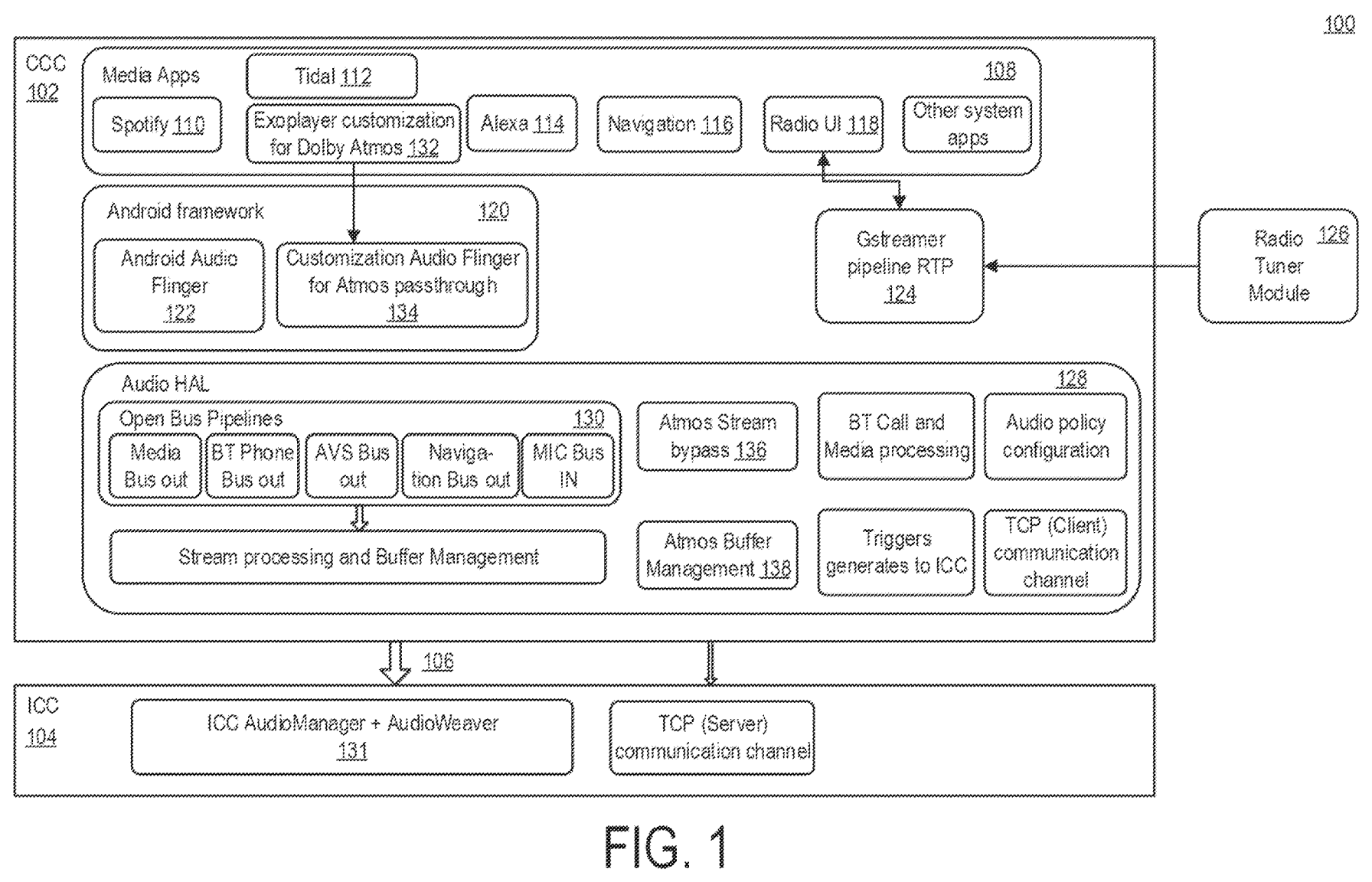

FIG. 1 shows a block diagram of an example of an audio system 100 that can provide an immersive audio experience in a vehicle. The audio system 100 can be used with one or more other examples described elsewhere herein. The audio system 100 can be implemented using some or all examples described below with reference to FIG. 5.

The audio system 100 can be implemented using one or more hardware boards. In some implementations, the audio system 100 includes a hardware board 102 and a hardware board 104 that are separate from each other. The hardware board 102 can be referred to as a communication control center (CCC). The hardware board 102 can include a display unit that controls a user interface (UI) (e.g., as part of a human-machine interface in a vehicle), or partitions of the memory of an operating system (e.g., for one or more types of files or folders); steering control; seat control; and/or system settings, to name a few examples. The hardware boards 102 and 104 can interface each other using at least one bus 106. The bus 106 can be a standard bus for transfer of streaming multimedia content.

In some implementations, the hardware board 104 can be connected to, and interact with, speakers, control parts, vehicle sensors, and/or can display vehicle information about speed or other information provided by vehicle sensors. For example, the hardware board 104 can be referred to as an interactive control center (ICC). The hardware board 104 can run an audio mixer for the vehicle, to decide what audio is a priority, what audio to duck, and what audio to play out aloud. For example, lane departure warnings can be generated by the hardware board 104. The hardware board 104 can be a LINUX console, to name just one example.

The audio system 100 can include an application layer 108. In some implementations, the application layer 108 can include media applications and optionally one or more other system applications. For example, the application layer 108 can include one or more of: a SPOTIFY application 110, a TIDAL application 112, an AMAZON ALEXA application 114, a navigation application 116, or a radio UI application 118.

The audio system 100 can include a framework 120 of an operating system. Any of multiple operating systems can be used. In some implementations, the operating system is an ANDROID operating system. The framework 120 can include a mixer 122. In some implementations, the mixer 122 is provided by the operating system. For example, the mixer 122 can be provided using ANDROID AUDIOFLINGER functionality. In some implementations, the applications in the application layer 108 are running under the ANDROID operating system. For example, the applications in the application layer 108 can be referred to as exoplayers regarding an ANDROID operating system.

The audio system 100 can include a real time protocol (RTP) component 124. In some implementations, the RTP component 124 can provide a media stream over internet protocol to one or more applications in the application layer 108. For example, a radio tuner module 126 can generate a stream that the RTP component 124 provides to the radio UI application 118.

The audio system 100 can include a hardware abstraction layer (HAL) 128 coupled to at least the framework 120. The HAL 128 can be implemented using a partition in memory managed by the operating system of the framework 120. The HAL 128 can include one or more open bus pipelines 130 for providing at least one data stream to a processing component. For example, the processing component can provide stream processing and/or buffer management for the open bus pipelines 130. The HAL 128 can have one or more other components, including, but not limited to, a component for BLUETOOTH (BT) call and media processing, a component for audio policy configuration, a component for generating triggers to the hardware board 104, and/or a component providing a transmission control protocol (TCP) communication channel.

The hardware board 104 can include a processing component 131 receiving one or more streams through the bus 106. In some implementations, the processing component 131 can provide decoding of data in the stream(s). For example, a DOLBY ATMOS decoder can be included in the processing component 131.

The audio system 100 can be adapted so as to support surround sound signal processing so as to provide an immersive audio experience for listeners. One or more of the applications in the application layer 108 can support surround-sound encoded audio. In some implementations, the TIDAL application 112 can provide surround-sound encoded data that includes a height dimension. For example, DOLBY ATMOS data can be provided. One or more other applications, by contrast (e.g., the SPOTIFY application 110 and the AMAZON ALEXA application 114) may not support DOLBY ATMOS audio data.

The application(s) supporting surround-sound encoded audio may be configured with a condition that the associated platform must support the corresponding playback capability. For example, the TIDAL application 112 may provide a DOLBY ATMOS data stream (e.g., a digital container of audio data) only if this is supported by the associated platform. Here, for example, the ANDROID operating system may not have native support for handling DOLBY ATMOS data streams.

One or more customizations can be provided in the audio system 100 to provide support for an immersive audio experience in which surround sound (e.g., using DOLBY ATMOS audio streams) can be provided. Where the application for surround-sound encoded audio has the above-mentioned condition of support for the corresponding playback capability, providing a bypass can cause the condition to be satisfied. Here, a customization 132 can be provided in the application layer 108. In some implementations, the customization 132 can modify exoplayer libraries to add support for a passthrough playback mode in the framework 120. Audio track for java is a basic class. There is also a default audio sync, and both default audio sync and audio sync can be part of an existing exoplayer. At least one of the default audio sync and audio sync can create an object an audio track through an audio track application programming interface, and configure it into a playback mode. Examples of playback modes that can be provided using the customization 132 include, but are not limited to, output passthrough mode and output non-passthrough mode. In some implementations, the audio track object(s) for playback of surround sound (e.g., a DOLBY ATMOS stream) can be configured into output passthrough mode. In some implementations, a specific class can be added to the exoplayer in the customization 132 to support passthrough by an audio track object for surround-sound data (e.g., a DOLBY ATMOS stream).

Other customizations can be made as well, to facilitate configuration to passthrough mode. In some implementations, a utility class can be customized to calculate the number of channels that the system can support. The system can have, say, six channels with the output size being 768 bytes, so the customization 132 can specify that six times 768 number of bytes can be sent by the exoplayer.

In some implementations, the customization 132 can specify audio capabilities. This can be done to showcase, with regard to the application in the application layer 108, what formatting capabilities exist in the audio system 100. Such capabilities can include, but are not limited to, AC-3 (audio compression sometimes referred to as DOLBY AC-3), enhanced AC-3 (EAC-3), or a joint object coding (JOC) format (e.g., EAC3-JOC).

In some implementations, a load control functionality can be provided or enhanced by way of the customization 132. When more data is needed, or data is requested, or when data is being fed, the load control can be used for appropriate control or communication. In some implementations, a lower watermark and a higher watermark can be used. When the data load is coming down from or below the lower watermark the data mode can be upped or otherwise increased to request more data from the application (e.g., the exoplayer). When the data load reaches the higher watermark more data will not be requested.

Here, a customization 134 can be provided in the framework 120 of the operating system. The customization 134 can provide a bypass of the mixer(s) that may be implemented in the framework 120. The customization 134 can facilitate that a surround-sound stream from an application in the application layer 108 is not mixed with any operating-system features of the framework 120 but rather passed (e.g., by way of using an output passthrough mode as a playback mode) directly to a specific partition (e.g., sometimes referred to as a vendor partition) for processing by the audio HAL 128.

In the audio HAL 128, a customization 136 can facilitate a bypass stream not being run through a mixer in the framework 120; rather, encoded data from the application (e.g., a DOLBY ATMOS stream from the TIDAL application 112) can be received as raw data by the HAL 128. When the audio HAL 128 receives content from the framework 120, it can check if the content is a surround-sound encoded stream or another stream (e.g., a stereo stream). Accordingly, these streams can be processed differently from each other in the audio system 100. For example, a stream from the SPOTIFY application 110 can be sent through the framework 120, and the mixer 122 (e.g., an ANDROID AUDIOFLINGER component) can perform the mixing, and thereafter the thus mixed data stream can be provided to the audio HAL 128. A surround-sound stream (e.g., from the TIDAL application 112), on the other hand can support at least two types of streams, including but not limited to, a stereo stream and a DOLBY ATMOS stream. When the stereo stream from the TIDAL application 112 is received in the framework 120, the stereo stream can follow the same path as the stream from the SPOTIFY application 110. By contrast, the ATMOS stream can bypass the mixer 122. In the audio HAL 128, the open bus pipelines 130 and certain other components (e.g., BT call and media processing component, audio policy configuration component, trigger component, or a TCP communication channel component) may not receive or otherwise process the ATMOS data stream.

In the audio HAL 128, a customization 138 can facilitate one or more other functionalities directed towards supporting the mixer bypass and/or provision of the surround-sound data stream to the appropriate decoder. When a surround-sound playback, a driver can be opened or otherwise generated in the audio HAL that performs buffer management. In some implementations, of the available channels, two channels can be used for a media studio, another channel can be used for phone calls, another channel can be used for a digital assistant (e.g., the ALEXA assistant), another channel can be used for navigation, and another channel can be used for a surround-sound data stream. The interfacing between boards (e.g., the hardware boards 102 and 104) can be associated with a deadline for time limit. Namely, the audio HAL 128 may be continuously receiving data from an application and cannot block the data for more than a specific limit of time (e.g., some number of a fraction of a second, including, but not limited to, some number of milliseconds.) For example, if the audio HAL 128 does not receive more data in a timely fashion, an underrun condition can occur. The buffer can be managed in a way that the UI (e.g., the ANDROID operating system) is not blocked, while frames are processed in a timely manner. As data is dumped to the buffer of a specific size, an account of how many bytes have been received, and how many have been returned downward in the audio system 100, can be incremented or otherwise updated. The audio HAL 128 can provide a report to the application (e.g., the TIDAL application 112) of how many frames have been returned.

In some implementations, rendering can be performed on a separate hardware than the processing by the audio HAL 128 (e.g., on the hardware board 104 as opposed to the hardware board 102). The audio HAL 128 may therefore not know exactly how much time has been played, or how many frames have been processed (e.g., decoded), as part of the rendering. A timestamp calculation can be performed (e.g., as part of the customization 138) for encoded bytes rendered for the surround-sound stream. In some implementations, an estimation of the number of frames can be provided to the application using or based on the timestamp calculation. For example, the estimation can be based on the number of bytes sent by the audio HAL 128.

In some existing approaches not corresponding to the present subject matter, a component corresponding to the audio HAL 128 may have a way of deducing or otherwise knowing what external devices are connected at the hardware board 104. If connected by a high-definition multimedia interface (HDMI) cable, the component may detect a callback event for the HDMI and will therefore know that HDMI is connected and that the stream can be passed through the HDMI. An operating system (e.g., the ANDROID operating system) can provide that functionality. In the present subject matter, by contrast, no HDMI communication may be available. Rather, the application (e.g., the TIDAL application 112) may simply send a stream and the audio HAL 128 may need to manage that stream in a way that it can be played back on a device. Moreover, the audio HAL 128 may not inherently or natively have a runtime mechanism to know whether an HDMI device or other consumer electronics device is to receive the data. In the present subject matter, a channel can therefore be opened at runtime (e.g., using or based on one or more of the customizations 132, 134, 136, or 138) whenever surround-sound data (e.g., an ATMOS stream) is received, a driver for that channel can then be opened in the audio HAL 128, processing can be performed, and the system can send the stream through that channel to a decoder (e.g., at the hardware board 104).

FIG. 2 shows an example of an audio system 200 that supports surround sound. The audio system 200 can be used with one or more other examples described elsewhere herein. The audio system 200 can be implemented using some or all examples described below with reference to FIG. 5.

The audio system 200 includes at least one audio source 202. The audio source 202 can be local to the vehicle (e.g., a local hard drive, memory, or other audio storage device), or can be remote (e.g., a network connection to one or more remotely located servers that supply audio content in one or more coding formats). Here, audio content 204 from the audio source 202 represents either a non-surround sound data stream (e.g., in FIG. 1, from any of the SPOTIFY application 110, the AMAZON ALEXA application 114, the navigation application 116, or the radio UI application 118, or a stereo stream from the TIDAL application 112), or a surround-sound data stream (e.g., an ATMOS stream from the TIDAL application 112). Other approaches can be used.

The audio system 200 can include an audio processor 206 that can receive or obtain from the audio source 202 the audio content 204. The audio processor 206 includes an operating system (OS) framework mixer 208. In some implementations, the OS includes an ANDROID OS. For example, the OS framework mixer 208 can be included in the ANDROID AUDIOFLINGER component. Of the audio content 204, the non-surround sound data stream can be provided to the OS framework mixer 208 for mixing.

The audio processor 206 includes framework mixer bypass 210. Of the audio content 204, the surround-sound data stream can be provided to the framework mixer bypass 210. For example, this can be done using or based on one or more of the customizations 132, 134, 136, or 138 in FIG. 1.

At least the audio processor 206 can be implemented in a vehicle 212, as schematically indicated. The vehicle 212 includes speakers for playing audio, including, but not limited to, a non-surround sound data stream, or a surround-sound data stream. One or more types of speaker types can be used, including, but not limited to, tweeter speakers, midrange speakers, full range speakers, and/or woofers. Each speaker (type) can include one or more transducers (e.g., a voice coil) for converting an electric input to sound waves. The vehicle 212 can include n number of tweeter speakers 214 that can have any of multiple arrangements within the vehicle 212. The vehicle 212 can include m number of midrange speakers 216 that can have any of multiple arrangements within the vehicle 212. The vehicle 212 can include p number of full range speakers 218 (sometimes referred to as twiddler speakers) that can have any of multiple arrangements within the vehicle 212. The vehicle 212 can include q number of woofers 220 (e.g., subwoofers) that can have any of multiple arrangements within the vehicle 212. Other approaches can be used.

Figure 3:
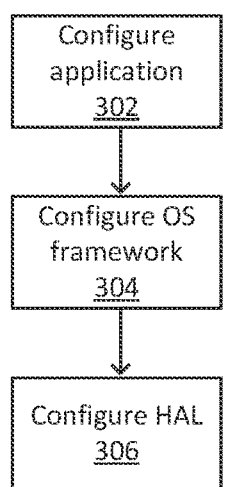
FIG. 3 is a flowchart of an example method of adapting an automotive audio system to support surround sound.
Figure 4:
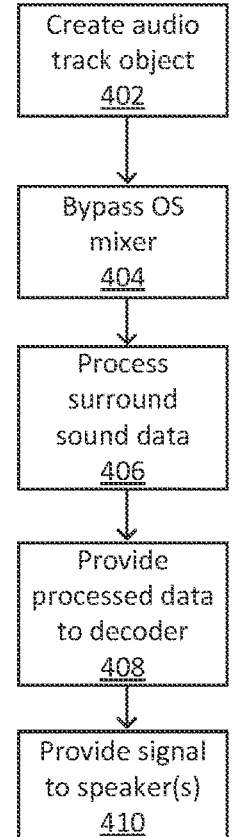
FIG. 4 is a flowchart of an example method of playing surround sound on an automotive audio system of a vehicle.

FIG. 3 is a flowchart of an example method 300 of adapting an automotive audio system to support surround sound. FIG. 4 is a flowchart of an example method 400 of playing surround sound on an automotive audio system of a vehicle. More or fewer operations can be performed. Two or more operations can be performed in a different order unless otherwise indicated.

At operation 302, an application program can be configured for creation of an audio track object that specifies passthrough mode as a playback mode. The application program can be installed to operate under an operating system that is not configured for surround sound. In some implementations, the TIDAL application 112 can be installed to operate under the ANDROID operating system and can create an audio track object for an ATMOS stream. For example, the TIDAL application 112 can be provided with the customization 132.

At operation 304, a framework of the operating system can be configured with a bypass past a mixer of the operating system. The bypass allows surround-sound data of the audio track object to bypass the mixer. In some implementations, the framework 120 can be provided with the customization 134. For example, the customization 134 can effectuate an output passthrough mode to bypass the mixer 122.

At operation 306, a hardware abstraction layer can be configured with a separate channel for the surround-sound data received from the operating system. The hardware abstraction layer can process the surround-sound data before providing the processed surround-sound data to a decoder. In some implementations, the audio HAL 128 can be provided with the customization 136 and/or 138.

Turning now to the method 400, operation 402 can involve creating, using an application program of the automotive audio system, an audio track object that specifies passback mode as a playback mode. The application program can be installed to operate under an operating system that is not configured for surround sound. In some implementations, the TIDAL application 112 can operate under the ANDROID operating system and can create an audio track object for an ATMOS stream using the customization 132.

Operation 404 can involve bypassing, in a framework of the operating system, a mixer of the operating system by surround-sound data of the audio track object. In some implementations, the customization 134 in the framework 120 can provide an output passthrough mode that bypasses the mixer 122.

Operation 406 can involve processing the surround-sound data at a hardware abstraction layer of the automotive audio system. In some implementations, the audio HAL 128 having the customizations 136 and 138 can perform buffer management and/or timestamp calculation.

Operation 408 can involve providing the processed surround-sound data to a decoder to generate a decoded surround sound signal. In some implementations, the audio HAL 128 can provide processed data to the hardware board 104 using the bus 106.

Operation 410 can involve providing the decoded surround sound signal to at least one of multiple speakers of the vehicle. In some implementations, the hardware board 104 can provide audio signals to one or more of the speakers of the audio system 200.

Figure 5:
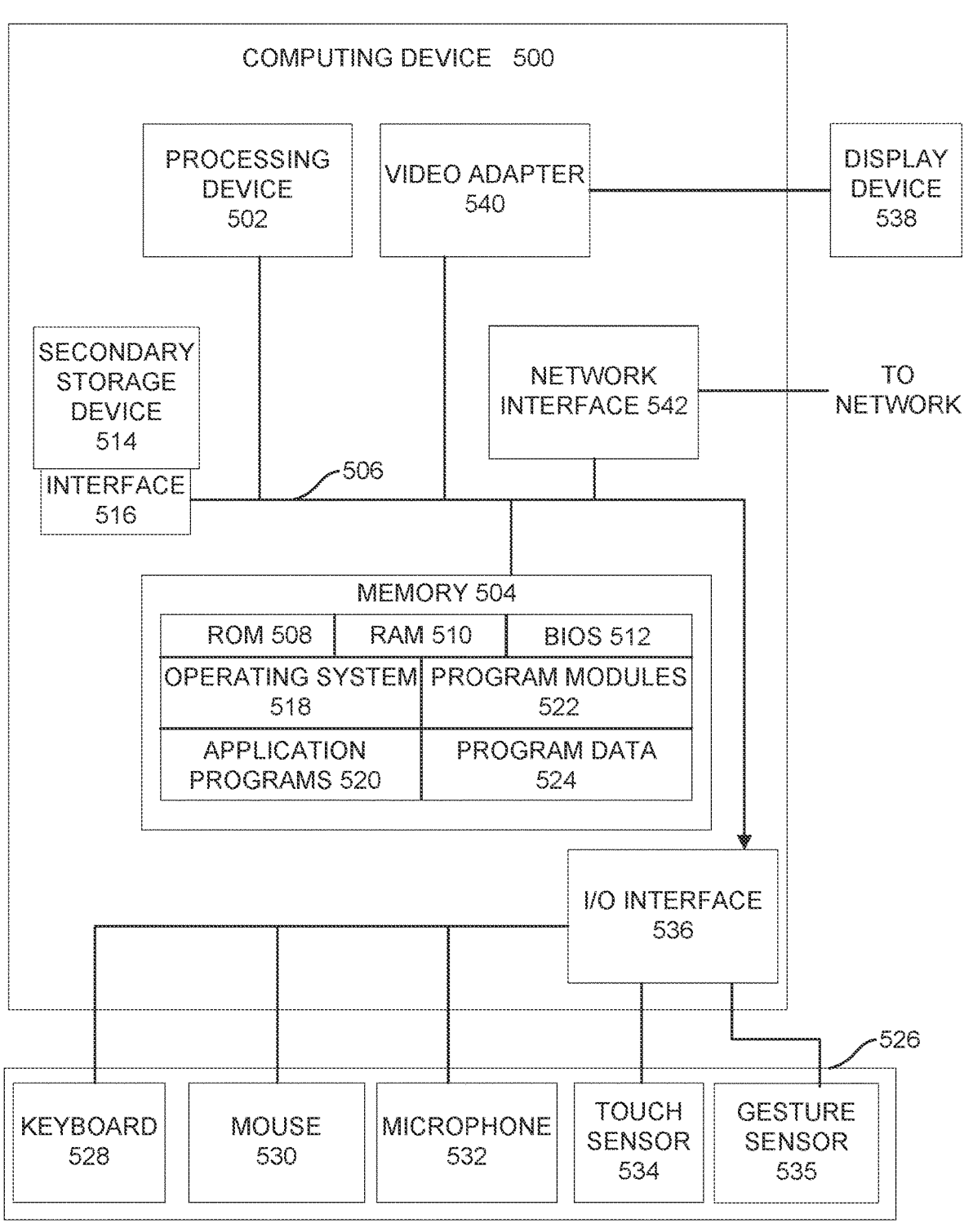
FIG. 5 illustrates an example architecture of a computer system.

FIG. 5 illustrates an example architecture of a computing device 500 that can be used to implement aspects of the present disclosure, including any of the systems, apparatuses, and/or techniques described herein, or any other systems, apparatuses, and/or techniques that may be utilized in the various possible embodiments.

The computing device illustrated in FIG. 5 can be used to execute the operating system, application programs, and/or software modules (including the software engines) described herein.

The computing device 500 includes, in some embodiments, at least one processing device 502 (e.g., a processor), such as a central processing unit (CPU). A variety of processing devices are available from a variety of manufacturers, for example, Intel or Advanced Micro Devices. In this example, the computing device 500 also includes a system memory 504, and a system bus 506 that couples various system components including the system memory 504 to the processing device 502. The system bus 506 is one of any number of types of bus structures that can be used, including, but not limited to, a memory bus, or memory controller; a peripheral bus; and a local bus using any of a variety of bus architectures.

Examples of computing devices that can be implemented using the computing device 500 include a desktop computer, a laptop computer, a tablet computer, a mobile computing device (such as a smart phone, a touchpad mobile digital device, or other mobile devices), or other devices configured to process digital instructions.

The system memory 504 includes read only memory 508 and random access memory 510. A basic input/output system 512 containing the basic routines that act to transfer information within computing device 500, such as during start up, can be stored in the read only memory 508.

The computing device 500 also includes a secondary storage device 514 in some embodiments, such as a hard disk drive, for storing digital data. The secondary storage device 514 is connected to the system bus 506 by a secondary storage interface 516. The secondary storage device 514 and its associated computer readable media provide nonvolatile and non-transitory storage of computer readable instructions (including application programs and program modules), data structures, and other data for the computing device 500.

Although the example environment described herein employs a hard disk drive as a secondary storage device, other types of computer readable storage media are used in other embodiments. Examples of these other types of computer readable storage media include magnetic cassettes, flash memory cards, solid-state drives (SSD), digital video disks, Bernoulli cartridges, compact disc read only memories, digital versatile disk read only memories, random access memories, or read only memories. Some embodiments include non-transitory media. For example, a computer program product can be tangibly embodied in a non-transitory storage medium. Additionally, such computer readable storage media can include local storage or cloud-based storage.

A number of program modules can be stored in secondary storage device 514 and/or system memory 504, including an operating system 518, one or more application programs 520, other program modules 522 (such as the software engines described herein), and program data 524. The computing device 500 can utilize any suitable operating system.

In some embodiments, a user provides inputs to the computing device 500 through one or more input devices 526. Examples of input devices 526 include a keyboard 528, mouse 530, microphone 532 (e.g., for voice and/or other audio input), touch sensor 534 (such as a touchpad or touch sensitive display), and gesture sensor 535 (e.g., for gestural input). In some implementations, the input device(s) 526 provide detection based on presence, proximity, and/or motion. Other embodiments include other input devices 526. The input devices can be connected to the processing device 502 through an input/output interface 536 that is coupled to the system bus 506. These input devices 526 can be connected by any number of input/output interfaces, such as a parallel port, serial port, game port, or a universal serial bus. Wireless communication between input devices 526 and the input/output interface 536 is possible as well, and includes infrared, BLUETOOTH® wireless technology, 802.11a/b/g/n, cellular, ultra-wideband (UWB), ZigBee, or other radio frequency communication systems in some possible embodiments, to name just a few examples.

In this example embodiment, a display device 538, such as a monitor, liquid crystal display device, light-emitting diode display device, projector, or touch sensitive display device, is also connected to the system bus 506 via an interface, such as a video adapter 540. In addition to the display device 538, the computing device 500 can include various other peripheral devices (not shown), such as speakers or a printer.

The computing device 500 can be connected to one or more networks through a network interface 542. The network interface 542 can provide for wired and/or wireless communication. In some implementations, the network interface 542 can include one or more antennas for transmitting and/or receiving wireless signals. When used in a local area networking environment or a wide area networking environment (such as the Internet), the network interface 542 can include an Ethernet interface. Other possible embodiments use other communication devices. For example, some embodiments of the computing device 500 include a modem for communicating across the network.

The computing device 500 can include at least some form of computer readable media. Computer readable media includes any available media that can be accessed by the computing device 500. By way of example, computer readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 500.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The computing device illustrated in FIG. 5 is also an example of programmable electronics, which may include one or more such computing devices, and when multiple computing devices are included, such computing devices can be coupled together with a suitable data communication network so as to collectively perform the various functions, methods, or operations disclosed herein.

In some implementations, the computing device 500 can be characterized as an ADAS computer. For example, the computing device 500 can include one or more components sometimes used for processing tasks that occur in the field of artificial intelligence (AI). The computing device 500 then includes sufficient proceeding power and necessary support architecture for the demands of ADAS or AI in general. For example, the processing device 502 can include a multicore architecture. As another example, the computing device 500 can include one or more co-processors in addition to, or as part of, the processing device 502. In some implementations, at least one hardware accelerator can be coupled to the system bus 506. For example, a graphics processing unit can be used. In some implementations, the computing device 500 can implement a neural network-specific hardware to handle one or more ADAS tasks.

The terms "substantially" and "about" used throughout this Specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%. Also, when used herein, an indefinite article such as "a" or "an" means "at least one."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

A number of implementations have been described. Nevertheless, it will be understood that various modifications may be made without departing from the spirit and scope of the specification.

In addition, the logic flows depicted in the figures do not require the particular order shown, or sequential order, to achieve desirable results. In addition, other processes may be provided, or processes may be eliminated, from the described flows, and other components may be added to, or removed from, the described systems. Accordingly, other implementations are within the scope of the following claims.

While certain features of the described implementations have been illustrated as described herein, many modifications, substitutions, changes and equivalents will now occur to those skilled in the art. It is, therefore, to be understood that appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A method of adapting an automotive audio system to support surround sound, the method comprising:

configuring an application program for creation of an audio track object that specifies passthrough mode as a playback mode, wherein the application program is installed to operate under an operating system that is not configured for surround sound;

configuring a framework of the operating system with a bypass past a mixer of the operating system, wherein the bypass allows surround-sound data of the audio track object to bypass the mixer; and configuring a hardware abstraction layer with a separate channel for the surround-sound data received from the operating system, wherein the hardware abstraction layer processes the surround-sound data before providing the processed surround-sound data to a decoder.

2. The method of claim 1, wherein configuring the application program comprises adding support for specifying the passthrough mode as the playback mode.

3. The method of claim 1, wherein the application program has a condition for providing surround sound output that the framework of the operating system should support surround sound playback, and wherein configuring the framework with the bypass causes the framework to satisfy the condition.

4. The method of claim 1, wherein the separate channel facilitates buffer management.

5. The method of claim 1, wherein the separate channel facilitates timestamp calculation.

6. The method of claim 5, wherein at least processing of the surround-sound data is performed using a first hardware board, wherein at least decoding is performed using a second hardware board separate from the first hardware board, and wherein the hardware abstraction layer uses the timestamp calculation to provide a frame estimate to the application program.

7. A method of playing surround sound on an automotive audio system of a vehicle, the method comprising:

creating, using an application program of the automotive audio system, an audio track object that specifies passthrough mode as a playback mode, wherein the application program is installed to operate under an operating system that is not configured for surround sound;

bypassing, in a framework of the operating system, a mixer of the operating system by surround-sound data of the audio track object;

processing the surround-sound data at a hardware abstraction layer of the automotive audio system;

providing the processed surround-sound data to a decoder to generate a decoded surround sound signal; and providing the decoded surround sound signal to at least one of multiple speakers of the vehicle.

8. The method of claim 7, wherein creating the audio track object, bypassing of the mixer, and processing the surround-sound data are performed using a first hardware board, and wherein decoding and providing the decoded surround sound signal are performed using a second hardware board separate from the first hardware board.

9. The method of claim 7, wherein the application program has a condition for providing surround sound output that the framework of the operating system should support surround sound playback, and wherein the bypassing of the mixer causes the framework to satisfy the condition.

10. The method of claim 7, wherein the processing of the surround-sound data comprises buffer management.

11. The method of claim 7, wherein the processing of the surround-sound data comprises timestamp calculation.

12. The method of claim 11, wherein at least the processing of the surround-sound data is performed using a first hardware board, and wherein at least decoding is performed using a second hardware board separate from the first hardware board, the method further comprising using the timestamp calculation to provide a frame estimate to the application program.

* * * * *